United States Patent
Warju, II et al.

(10) Patent No.: US 10,259,365 B2
(45) Date of Patent: Apr. 16, 2019

(54) ARTICULATING LOCKING MECHANISM FOR A SEATBACK

(71) Applicant: Ford Global Technologies, LLC, Dearborn, MI (US)

(72) Inventors: Bryan D. Warju, II, Lake Orion, MI (US); Mark Caye, Allen Park, MI (US); Peter Kennedy, Bloomfield, MI (US); Michael Kryzaniwskyj, Warren, MI (US); Khaled Ayyash, Ann Arbor, MI (US); Kurt Kormos, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 378 days.

(21) Appl. No.: 15/215,205

(22) Filed: Jul. 20, 2016

(65) Prior Publication Data

US 2018/0022256 A1   Jan. 25, 2018

(51) Int. Cl.
| | |
|---|---|
| *B60N 2/68* | (2006.01) |
| *F16B 2/24* | (2006.01) |
| *F16C 11/04* | (2006.01) |
| *F16C 27/02* | (2006.01) |

(52) U.S. Cl.
CPC .............. *B60N 2/682* (2013.01); *F16B 2/241* (2013.01); *F16C 11/04* (2013.01); *F16C 27/02* (2013.01); *F16C 2326/08* (2013.01); *Y10T 403/32336* (2015.01)

(58) Field of Classification Search
CPC . B60N 2/20; B60N 2/22; B60N 2/682; B60N 2002/684; F16B 2/22; F16B 2/24; F16B 2/241; F16C 11/04; F16C 2326/08; Y10T 403/32106; Y10T 403/32327; Y10T 403/32336; Y10T 403/32819; Y10T 403/32951; Y10T 403/59; Y10T 403/599; Y10T 403/60; Y10T 403/602; Y10T 403/606; Y10T 403/608
USPC ..... 403/65, 92, 93, 145, 161, 321, 325–327, 403/329, 330
See application file for complete search history.

(56) References Cited

U.S. PATENT DOCUMENTS

| | | | |
|---|---|---|---|
| 5,685,612 A | | 11/1997 | MacDonald et al. |
| 5,833,203 A | * | 11/1998 | Denis ................. B60N 2/01525 248/503.1 |
| 6,669,298 B2 | | 12/2003 | Thorn et al. |
| 7,083,215 B2 | | 8/2006 | Rhee et al. |
| | | (Continued) | |

FOREIGN PATENT DOCUMENTS

EP        1630432 A1 *  3/2006  .............. F16C 11/10

*Primary Examiner* — Josh Skroupa
(74) *Attorney, Agent, or Firm* — Vichit Chea; Price Heneveld LLP (57) ABSTRACT

An articulating locking mechanism includes a support bracket with an upwardly opening receiving slot having an open top portion and closed bottom portion. A spring member is coupled to the support bracket at a mounting portion and includes a ramp portion disposed adjacent to the receiving slot. A pivot member includes a pivot bushing and a rotating mounting shaft extending outwardly from the pivot bushing. The pivot bushing is received in the receiving slot of the support bracket, and is retained by the ramp portion of the spring member when the pivot bushing is fully seated in the receiving slot of the support bracket.

16 Claims, 11 Drawing Sheets

(56) References Cited

U.S. PATENT DOCUMENTS

| | | | |
|---|---|---|---|
| 7,413,371 B2 * | 8/2008 | Arnold | B60R 22/18 403/329 |
| 7,581,793 B2 | 9/2009 | Hartmann et al. | |
| 7,766,573 B1 * | 8/2010 | Wolf | E05B 65/1033 403/325 |
| 8,528,977 B2 | 9/2013 | Naughton | |
| 8,720,847 B2 | 5/2014 | Reimann | |
| 8,944,506 B2 * | 2/2015 | Zeimis, III | B60N 2/682 297/333 |
| 9,132,748 B2 | 9/2015 | Park | |

* cited by examiner

ARTICULATING LOCKING MECHANISM FOR A SEATBACK

FIELD OF THE INVENTION

The present invention generally relates to an articulating locking mechanism, and more particularly, to an articulating locking mechanism having a set-in-place lock configuration and a noise dampening bumper.

BACKGROUND OF THE INVENTION

In the automotive industry, it is common to include a vehicle seat having a seat portion and a seatback, wherein the seatback is pivotally coupled to supporting features for the seat portion. In known seatback coupling systems, it is common to have a pivot member coupled to a receiving member disposed on a support bracket for the vehicle seat. The pivot member may include a nut and bolt configuration that is received through a receiving aperture in a support bracket. This type of pivoting connection takes a considerable amount of time to install, and is a likely source of vibration noise during the operation of a vehicle in which this coupling arrangement is installed. The present concept provides for a quick set-in-place style coupling between a support bracket and pivot member along with anti-vibration features to reduce noise during vehicle use.

SUMMARY OF THE INVENTION

One aspect of the present invention includes an articulating locking mechanism having a support bracket with an upwardly opening receiving slot including an open top portion and closed bottom portion. A spring member is coupled to the support bracket at a mounting portion and includes a ramp portion disposed adjacent to the receiving slot. A pivot member includes a pivot bushing and a rotating mounting shaft extending outwardly from the pivot bushing. The pivot bushing is received in the receiving slot of the support bracket, and is retained by the ramp portion of the spring member when the pivot bushing is fully seated in the receiving slot of the support bracket.

Another aspect of the present invention includes an articulating locking mechanism having a support bracket with a receiving slot. A spring member is coupled to the support bracket and includes a deflectable ramp portion disposed adjacent to the receiving slot. A pivot member includes a pivot bushing received in the receiving slot of the support bracket and retained by the ramp portion of the spring member as received in the receiving slot.

Yet another aspect of the present invention includes an articulating locking mechanism having a support bracket with outwardly opening receiving slot having an open top portion and closed bottom portion. A spring member is coupled to the support bracket at a mounting portion and includes a ramp portion operable between at-rest and loaded positions adjacent to the receiving slot. A pivot member includes a pivot bushing and a rotating mounting shaft extending outwardly from the pivot bushing. The pivot bushing is received in the receiving slot of the support bracket and is retained therein by the ramp portion of the spring member when the pivot member is fully seated in the receiving slot.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1A:
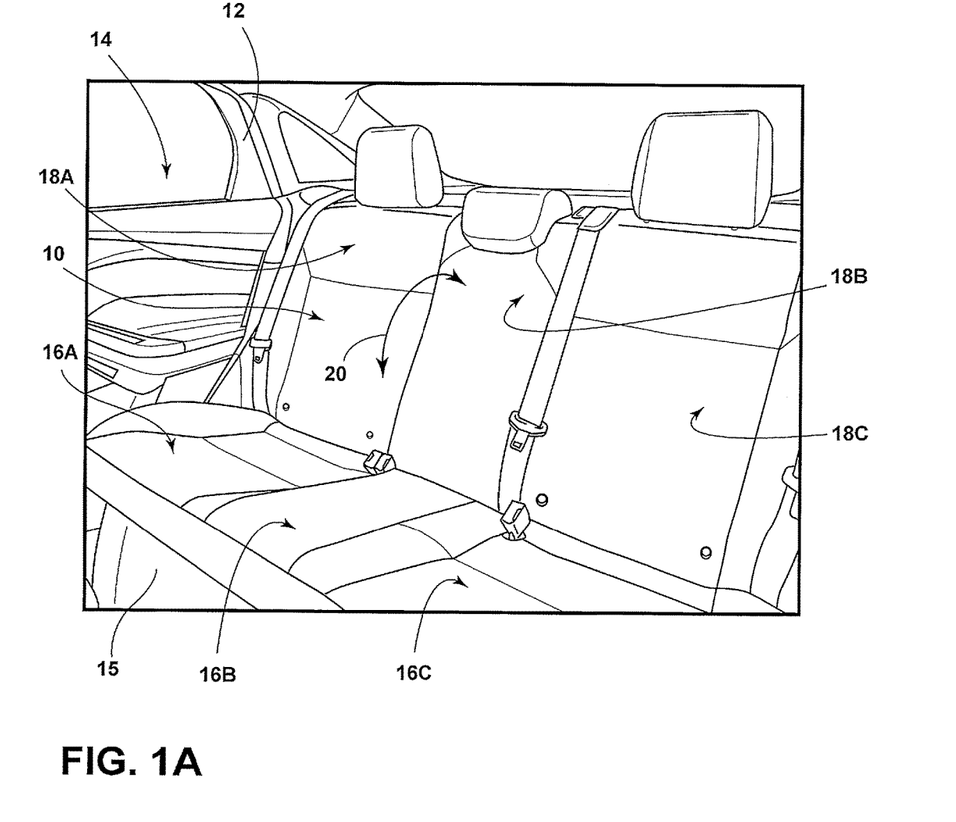
FIG. 1A is a front perspective view of a rear seat assembly disposed in a vehicle interior and having a seat portion and seatback.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1A, a rear seat assembly 10 is shown disposed within a vehicle interior 14 of a vehicle 12. The rear seat assembly 10 includes seat portions 16A, 16B and 16C, as well as seatback portions 18A, 18B, and 18C setup in a bench-style rear seat configuration. The seatback portions 18A, 18B, and 18C are contemplated to be pivotally coupled to the vehicle 12 for pivoting adjustment along the path indicated by arrow 20 between upright and folded-down positions. The rear seat assembly 10 of FIG. 1A is shown as a rear seat assembly, however, it is contemplated that the present invention may be used in a vehicle seat in any location within a vehicle interior, including driver and passenger seats, rear seats, and third row passenger seat options. As such, the rear seat assembly 10 shown in FIG. 1A is not intended to limit the spirit of the present invention to a particular vehicle seat arrangement in any manner.

In the embodiment shown in FIG. 1A, the rear seat assembly 10 is contemplated to include seatback frame members for supporting seatback portion 18A in an independent manner relative to seatback portions 18B, 18C. The configuration of a seatback frame assembly is described below with reference to FIG. 1B. Further, it is contemplated that the seatback portions 18A, 18B, and 18C may all operate independently of one another depending on the seatback frame configuration used to support the seatback portions 18A, 18B, and 18C.

Figure 1B:
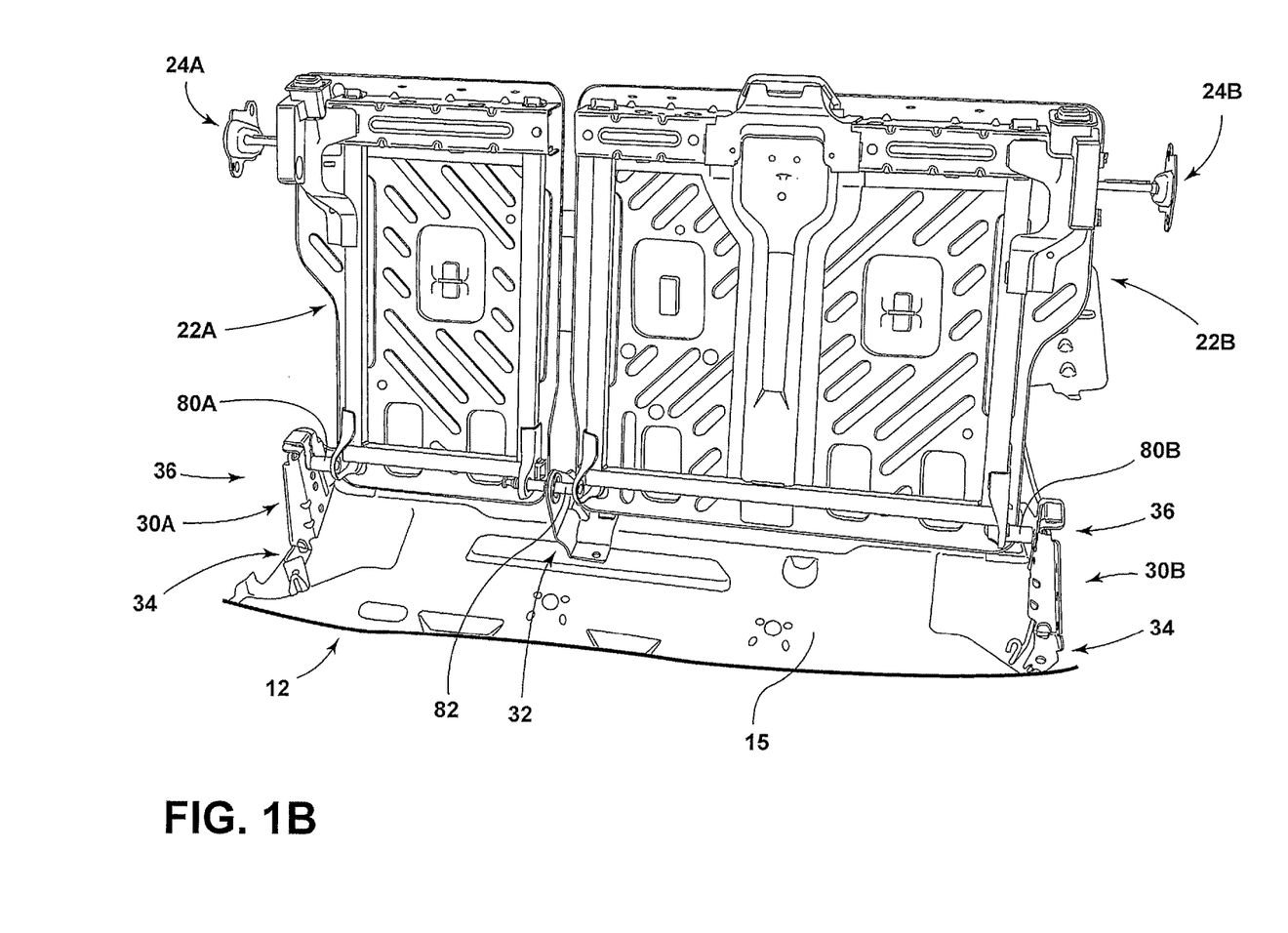
FIG. 1B is a front perspective view of a seatback frame coupled to a vehicle frame.

Referring now to FIG. 1B, the seat portions 16A, 16B, and 16C have been removed as well as the cushioned material covering seatback portions 18A, 18B, and 18C in FIG. 1A to reveal seatback frame members 22A, 22B shown in upright positions relative to a vehicle frame 15. The vehicle frame 15 is contemplated to be a stamped metal part having support brackets 30A, 30B coupled thereto in a spaced-apart relationship. The support brackets 30A, 30B are outer support brackets configured to support the seatback frame members 22A, 22B in an articulating manner between upright and folded down positions. Thus, in FIG. 1B, seatback frame member 22A is contemplated to provide the structural support for seatback portion 18A, while seatback frame member 22B is contemplated to provide the structural support for seatback portions 18B and 18C shown in FIG. 1A. With the seatback frame members 22A, 22B shown in the upright position in FIG. 1B, the seatback frame members 22A, 22B are engaged with locking mechanisms 24A and 24B disposed on opposite sides of the vehicle 12. The locking mechanisms 24A, 24B are contemplated to selectively retain the seatback frame members 22A, 22B in their respective upright positions. When the locking mechanisms 24, 24B are released by a user, the seatback frame members 22A, 22B can be folded downward for access to a rear cargo area of the vehicle 12 and/or to provide a flat surface within the interior 14 of the vehicle 12. In the embodiment shown in FIG. 1B, an intermediate support bracket 32 is shown supporting the seatback frame members 22A, 22B at the pivot member 82 thereof. The support brackets 30A, 30B and intermediate support bracket 32 are contemplated to be coupled to the vehicle frame 15 by fasteners, welding, or other known attachment techniques common in the vehicle industry. Each support bracket 30A, 30B includes an anchor portion 34 and a riser portion 36. The anchor portion 34 is coupled to the vehicle frame 15, while the riser portion 36 extends upwardly from the anchor portion 34 to couple to pivot members 80A, 80B extending outwardly from lower portions of the seatback frame members 22A, 22B on opposite sides thereof.

Figure 2:
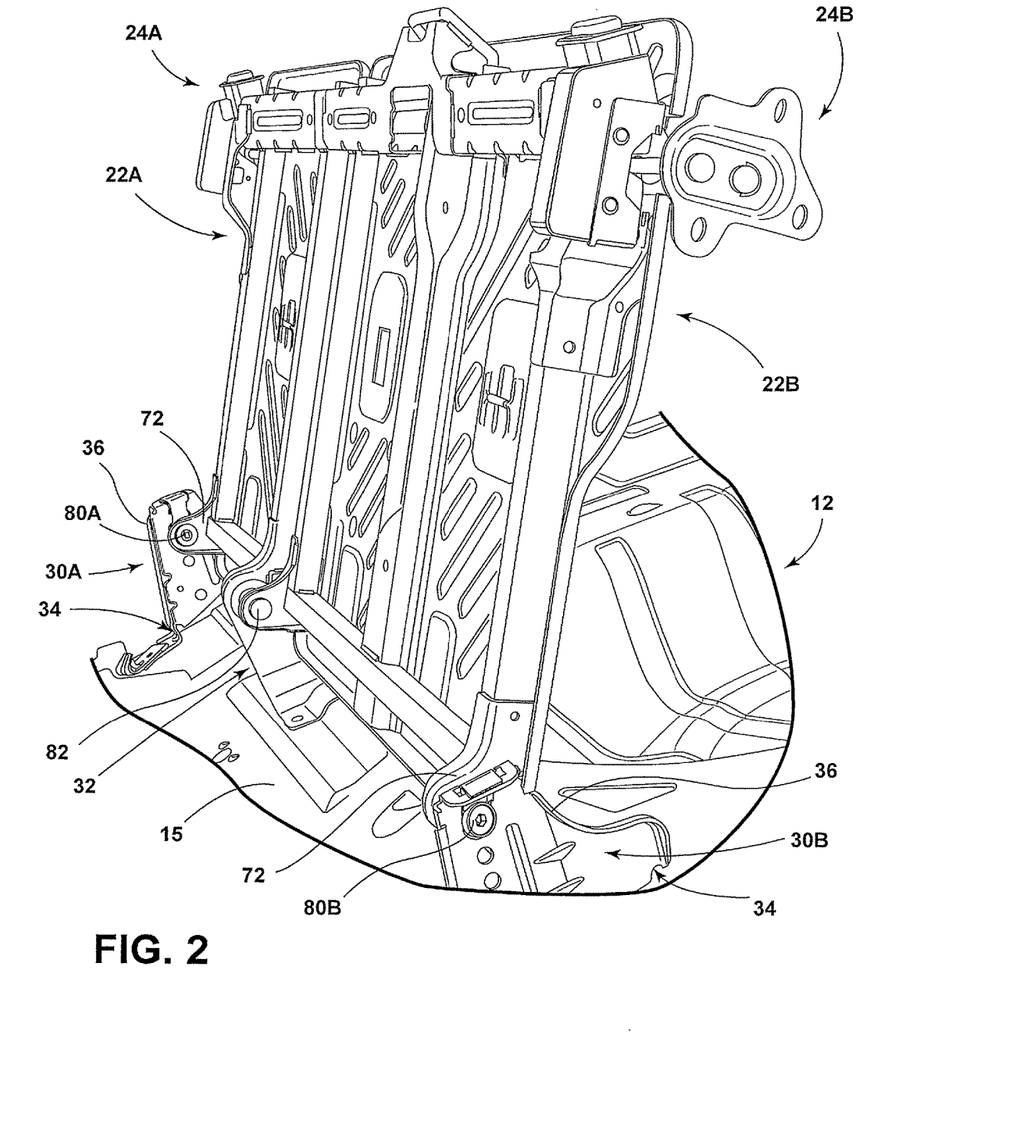
FIG. 2 is a top perspective view of support brackets coupled to the seatback frame of FIG. 1B within a vehicle interior.

Referring now to FIG. 2, the support brackets 30A, 30B are configured to receive pivot members 80A, 80B in a set-in-place or drop style engagement. In this way, the seatback portions 18A, 18B, and 18C are configured to be quickly and efficiently coupled to the support brackets 30A, 30B in a pivoting or articulating manner. While the coupling of the seatback portions 18A, 18B, and 18C to the support brackets 30A, 30B is intended to be a pivoting coupling, the connection therebetween is a robust connection that may be selectively released as necessary.

Figure 3:
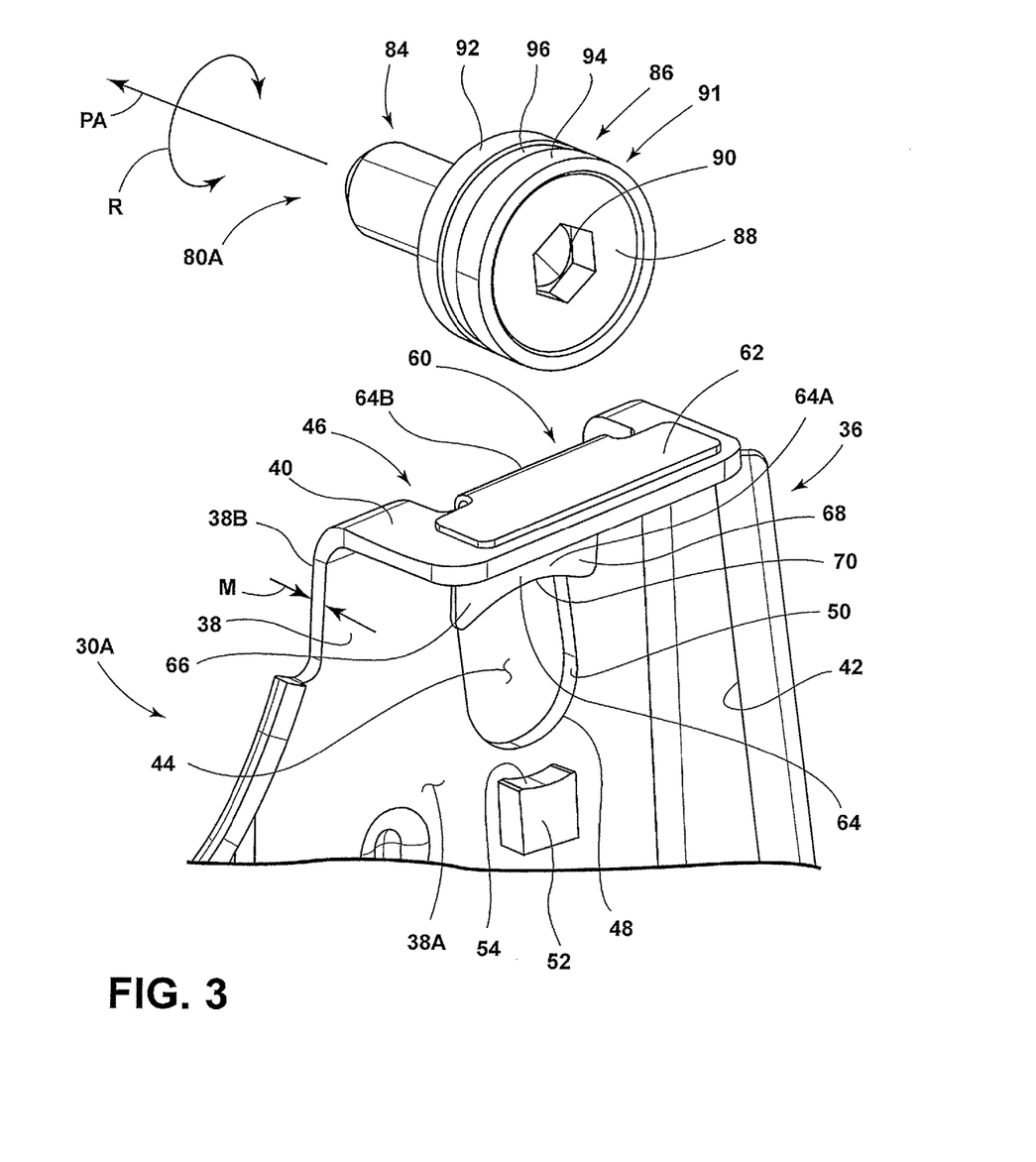
FIG. 3 is a fragmentary top perspective view of a support bracket of FIG. 2 having a pivot member exploded away therefrom.

Referring now to FIG. 3, the riser portion 36 of the support bracket 30A is shown having a body portion 38, an upper mounting tab 40 extending outwardly from the body portion 38, and a side flange 42. The riser portion 36 further includes a receiving slot 44 disposed through the body portion 38. The receiving slot 44 includes an open top 46 and a closed bottom portion 48 to define an upwardly an outwardly opening receiving slot 44. The receiving slot 44 is shown in FIG. 3 as an upwardly opening receiving slot for vertical reception of a pivot member 80A or 80B, as further described below. However, it is contemplated that the receiving slot 44 can be an outwardly opening slot that is not necessarily upwardly opening. Horizontal or angled slots can be used as configurations for the receiving slot 44 of the present concept.

As the receiving slot 44 of FIG. 3 is disposed through the body portion 38 of the riser 36, a rim portion 50 of the receiving slot 44 is further defined by a material thickness M of the body portion 38. The body portion 38 includes an outer surface 38A and an inner surface 38B. On the outer surface 38A of the riser portion 36, a bumper member 52 is disposed directly below the closed bottom portion 48 of the receiving slot 44. The bumper member 52 includes an upper contact surface 54 and is contemplated to be a flexibly resilient member that is used as an anti-vibration or noise dampening device, as further described below. The upper contact surface 54 may be curved to accommodate a lower surface of the pivot member 80A in use. Disposed on the upper mounting tab 40, a spring member 60 is shown having a substantially horizontal mounting portion 62 and a ramp portion 64 extending downwardly at an inwardly inclined angle therefrom towards the receiving slot 44. In assembly, the mounting portion 62 is mounted to the mounting tab 40 of the riser 36. As shown in FIG. 3, the ramp portion 64 extends downwardly over the open top 46 of the receiving slot 44, such that the ramp portion 64 is disposed adjacent to the receiving slot 44. The ramp portion 64 includes an outer surface 64A and an inner surface 64B. In use, the ramp portion 64 is configured to deflect outwardly to a loaded or flexed position as a pivoting member is received in the receiving slot 44, as further described below. In the embodiment shown in FIG. 3, the ramp portion 64 is shown in an at-rest position with corner portions 66, 68 thereof disposed on opposite sides of a rounded lower edge 70. In FIG. 3, support bracket 30A is shown as an exemplary support bracket. It is contemplated that support bracket 30B is similar to support bracket 30A, as described above, in a mirrored configuration relative to support bracket 30A.

As further shown in FIG. 3, pivot member 80A is shown in a disengaged position above the riser 36 of support bracket 30A. Pivot member 80A is substantially similar to pivot member 80B, such that the description of pivot member 80A is representative of pivot member 80B as well. Pivot member 80A includes a mounting shaft 84 configured to be received through attachment brackets 72 shown in FIG. 2 on the seatback frame members 22A, 22B. Thus, the mounting shaft 84 is configured to inwardly extend from a pivot bushing 86. The pivot bushing 86 includes a head portion 88 having a centrally disposed engagement feature 90. The engagement feature 90 is shown in FIG. 3 as a hexagonal inset socket used to receive a tool for adjusting a position of the pivot member 80A. As further shown in FIG. 3, pivot bushing 86 further includes an outer sleeve 91 having first and second shoulder members which are wrapped around the head portion 88 in a spaced-apart relationship to define an inset channel 96 therebetween. The mounting shaft 84 is contemplated to be rotatable relative to the pivot bushing 86. In this way, the pivot member 80A defines a pivoting member which allows for a seatback frame member to articulate as fixedly coupled to the mounting shaft 84. In this way, the pivot member 80A defines a pivot axis PA in which the mounting shaft 84 can rotate in a direction as indicated by arrow R. The rotation along the path as indicated by arrow R correlates to upright and downward folded positions of a seatback portion in use. It is contemplated that the pivot member 80A may be a metallic part as it relates to the mounting shaft 84 and head portion 88. It is further contemplated that the outer sleeve 91 may be a metal component or a polymeric component wrapped around the head portion 88 of the pivot member 80A.

Figure 4A:
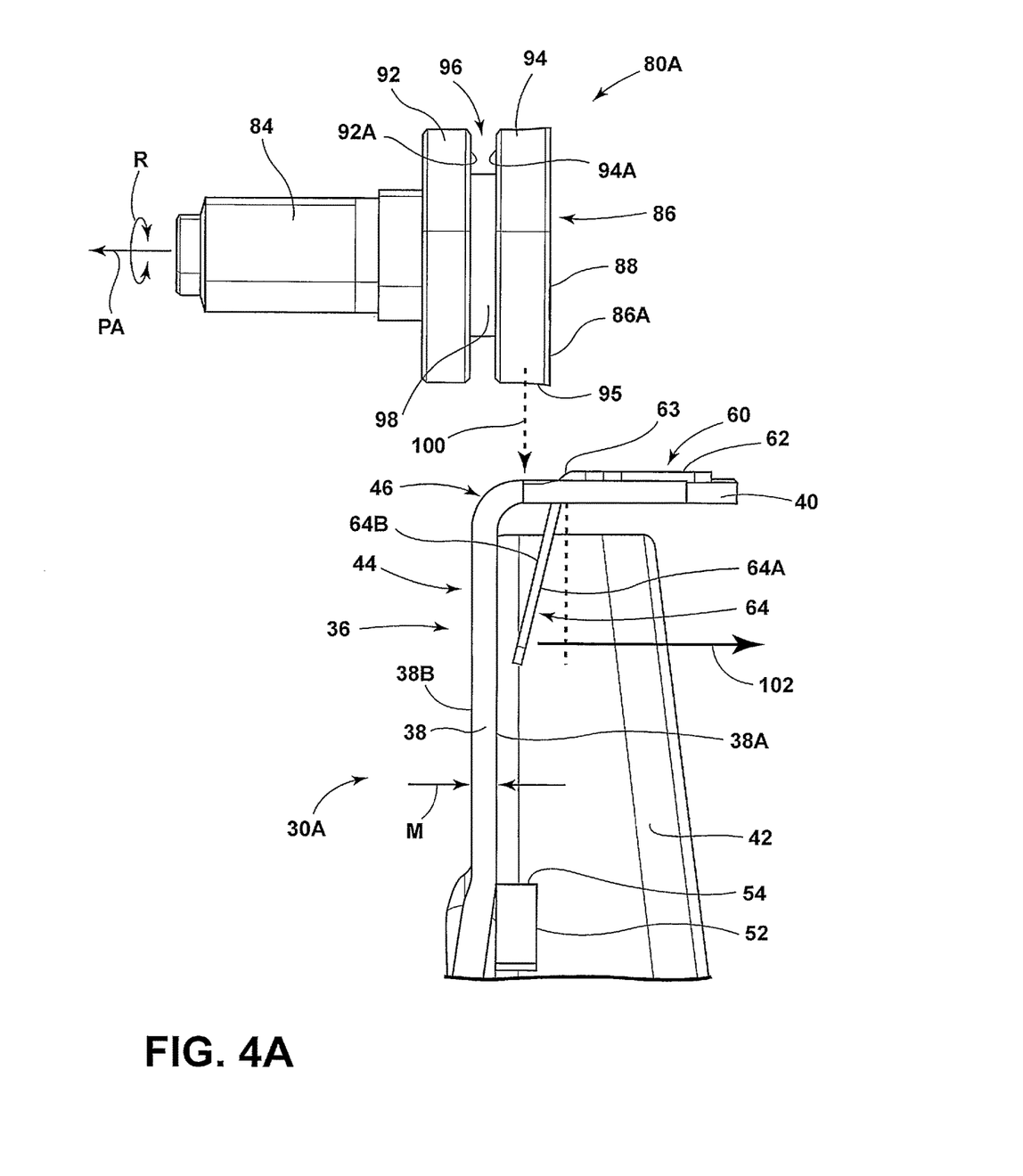
FIG. 4A is a front elevational view of the support bracket and pivot member of FIG. 3 showing relative movement of the pivot member into a slot of the support bracket, and also showing relative movement of a locking ramp feature.

Referring now to FIG. 4A, the pivot member 80A is shown disposed above the support bracket 30A. In the side view of FIG. 4A, the pivot member 80A is shown as having a seat surface 98 disposed within the inset channel 96 between first and second shoulder members 92, 94. In mounting a seatback frame to the support bracket 30A, the pivot member 80A is moved downwardly in a direction as indicated by arrow 100 towards the open top 46 of receiving slot 44 of the support bracket 30A. As the pivot member 80A is moved downwardly within the receiving slot 44, the second shoulder member 94 is configured to contact the ramp portion 64 to urge or deflect the ramp portion 64 from the at-rest position shown in FIG. 4A, to a loaded position L1 shown in FIG. 4B. Relative movement or deflection of the ramp portion 64 is indicated in FIG. 4A by arrow 102. Thus, the spring member 60 includes a living hinge 63 disposed between the mounting portion 62 and the ramp portion 64, such that the ramp portion 64 can be driven outward to the loaded position L1 shown in FIG. 4B. The angled configuration of the ramp portion 64 of the spring member 60 allows for the pivot bushing 86 to easily engage the inner surface 64B of the ramp portion 64 for deflection thereof by an outer surface 86A of the pivot bushing 86. As further shown in FIG. 4A, the second shoulder member 94 includes a bottom surface 95 that is configured to abut the upper contact surface 54 of the flexibly resilient bumper 52 when the pivot member 80A is in a fully seated position shown in FIGS. 5A and 5B. As further shown in FIG. 4A, the inset channel 96 is defined by inner sidewalls 92A, 94A of the first and second shoulder members 92, 94, and further defined by seating surface 98. When the pivot member 80A is fully seated within the support bracket 30A, the inner surfaces 92A, 94A of first and second shoulder members 92, 94 are configured to be disposed on opposite sides of the body portion 38 of the riser 36. Thus, the second shoulder member 94 defines an outermost portion of the pivot member 80A, that is configured to deflect and be retained by the ramp portion 64 of the spring member 60 and further contact the bumper 52 at upper contact surface 54.

Figure 4B:
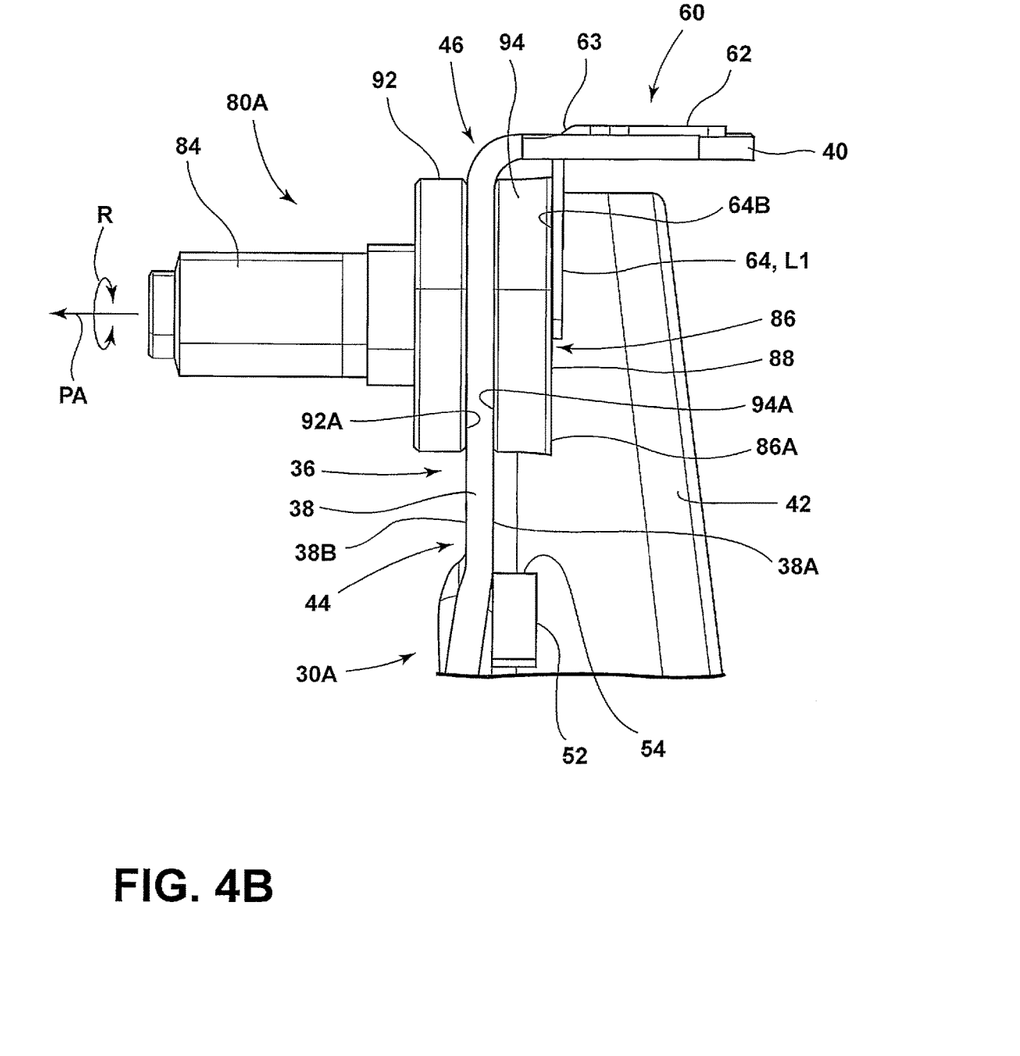
FIG. 4B is a front elevational view of the pivot member and support bracket of FIG. 4A, wherein the pivot member is partially inserted into the slot of the support member, thereby displacing the locking ramp feature from an at-rest position shown in FIG. 4A to a flexed or loaded position shown in FIG. 4B.

Referring now to FIG. 4B, the pivot member 80A is shown partially received in the receiving slot 44 of the riser 36. In this partially received position, the pivot member 80A has deflected the ramp portion 64 to the loaded position L1 by engagement of the outer surface 86A of the pivot bushing 86 on the inner surface 64B of the ramp portion 64. Thus, in the embodiment shown in FIG. 4B, the spring member 60 has flexed L1 at the living hinge portion 63 to deflect the ramp portion 64 to the loaded position L1 due to the engagement of the pivot bushing 86 with the ramp portion 64. The inner surfaces 92A, 94A are shown engaged with the inner and outer surfaces 38B, 38A of the body portion 38 of the riser 36. In this way, the first and second shoulder members 92, 94 are disposed on opposite sides of the body portion 38 of the riser 36 as the pivot member 80A is moved to the fully seated position.

Figure 5A:
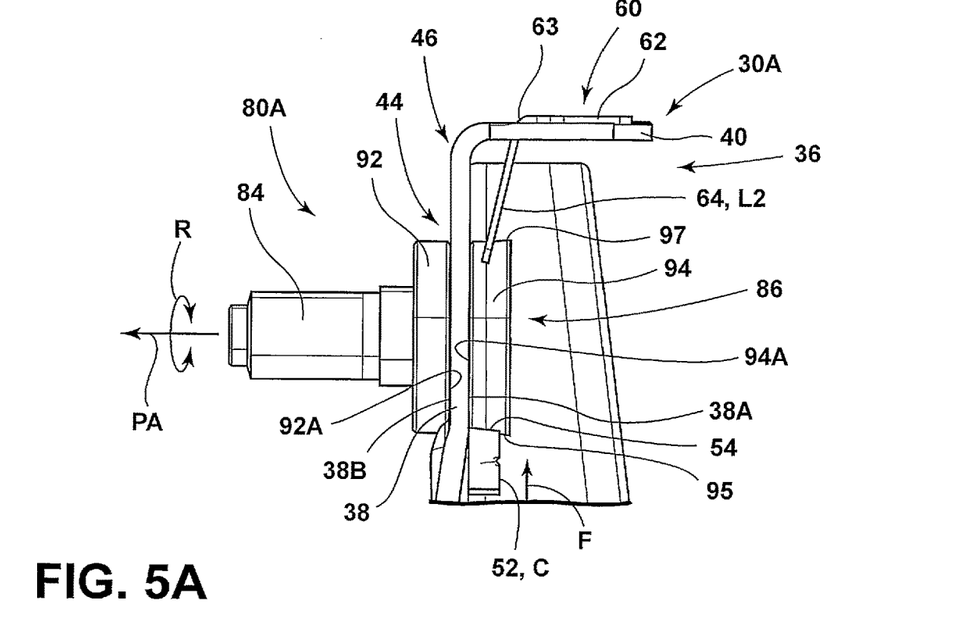
FIG. 5A is a front elevational view of the pivot member and support bracket of FIG. 4B with the pivot member fully seated in the slot of the support bracket and the locking ramp feature returned to an at-rest condition.

Referring now to FIG. 5A, the pivot member 80A is shown fully seated within the receiving slot 44 of support bracket 30A. In this seated position, the bottom surface 95 of second shoulder member 94 has contacted the upper contact surface 54 of bumper 52, such that the bumper 52 is shown in FIG. 5A in a compressed condition C. With the bumper 52 in a compressed condition C, it is contemplated that the bumper 52 imparts an upwardly directed force, indicated by arrow F, on the lower surface 95 of the second shoulder member 94. In this way, the bumper 52 provides a constant force F in an upward direction on the pivot bushing 86 to prevent against rattle and unnecessary vibration between the coupling of the pivot member 80A and the support bracket 30A to reduce or dampen any noise between this coupling. The bumper 52 is shown as imparting an upward force in the configuration shown in FIG. 5A, however, it is contemplated that the bumper 52 may impart any outward force directed towards the pivot member 80A, and is not limited to an upwardly directed force.

As further shown in FIG. 5A, the ramp portion 64 of the spring member 60 has sprung back to a locked position L2, wherein the lower edge 70 of the ramp portion 64 is disposed on an upper surface 97 of the second shoulder member 94. In this way, the ramp portion 64 positively retains the pivot bushing 86 in the receiving slot 44 of the support bracket 30A. It is contemplated that as the pivot bushing 86 is inserted into the receiving slot 44, the ramp portion 64 of the spring member 60 deflects to the loaded position L1 (FIG. 4B) and snaps back to the at-rest or locked position L2 once the upper surface 97 of second shoulder member 94 clears the lower edge 70 of the ramp portion 64. In the configuration shown in FIG. 5A, the pivot member 80A is contemplated to be positively retained within the support bracket 30A at receiving slot 44, yet the mounting shaft 84 is free to rotate in a direction as indicated by arrow R along pivot axis PA, such that a seatback frame member is free to rotate with the mounting shaft 84 while the pivot bushing 86 is positively retained in the support bracket 30A.

Figure 5B:
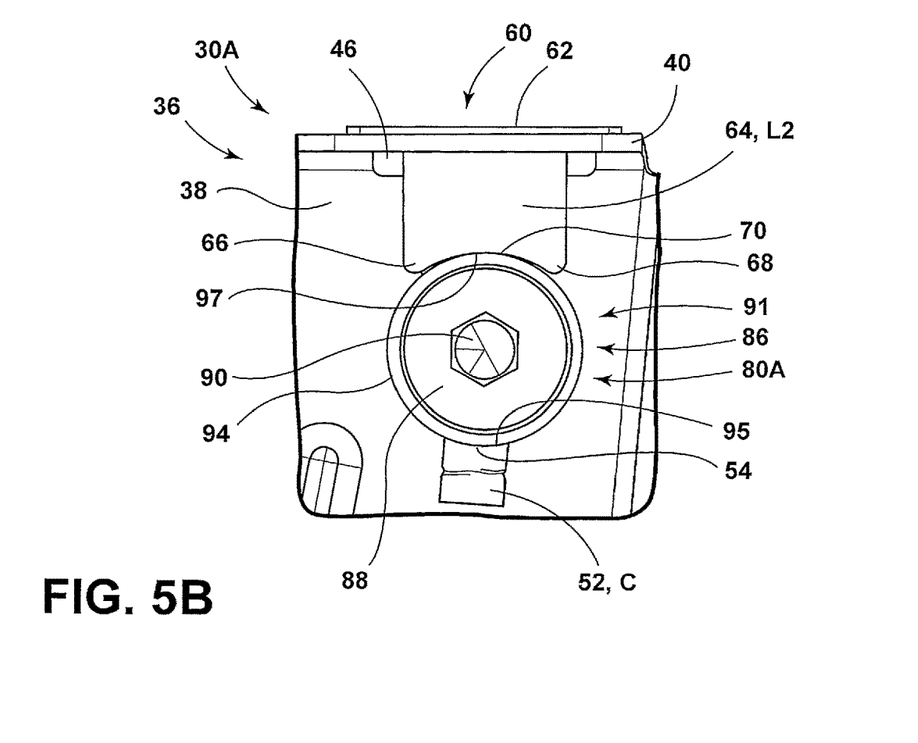
FIG. 5B is a fragmentary side elevational view of the pivot member and support bracket of FIG. 5A.

Referring now to FIG. 5B, the pivot member 80A is shown positively retained in the support bracket 30A with the lower edge 70 of the ramp portion 64 of spring member 60 being disposed on the upper surface 97 of second shoulder member 94 of the pivot bushing 86. Corner portions 66, 68 of the ramp portion 64 further help to retain the pivot bushing 86 in the seated position within receiving slot 44. In the fully seated position, the pivot member 80A is contemplated to have the seating surface 98 (FIG. 4A) abutting against the rim portion 50 (FIG. 3) of the receiving slot 44. Thus, it is contemplated that the first and second shoulder members 92, 94 are spaced-apart to a degree sufficient to accommodate for the material thickness M of the body portion 38 of the riser 36 as shown in FIG. 4A.

Figure 6A:
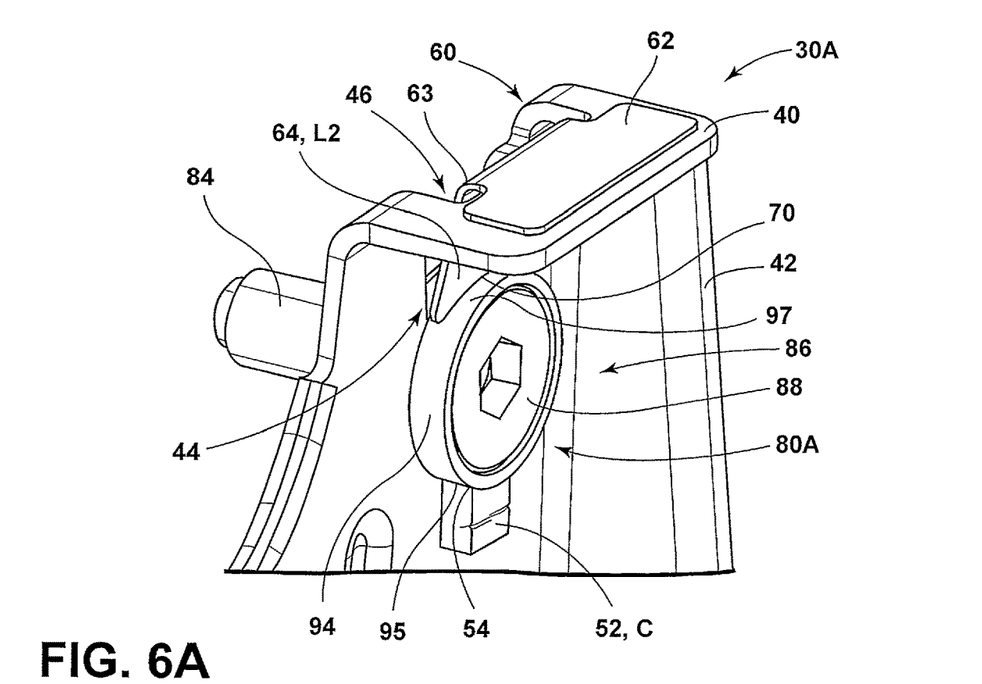
FIG. 6A is a top perspective view of the pivot member and support bracket of FIG. 5B.
Figure 6B:
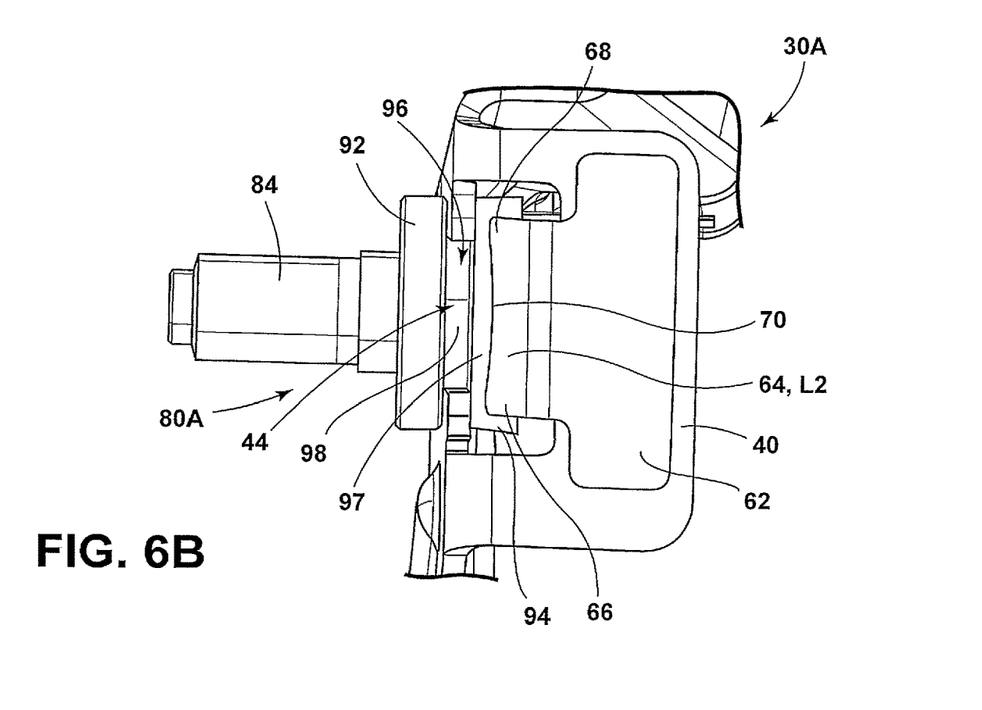
FIG. 6B is a top plan view of the support bracket and pivot member of FIG. 6A.

Referring now to FIGS. 6A and 6B, the pivot member 80A is shown in the fully seated position within the receiving slot 44 of the riser 36 of the support bracket 30A. As best shown in FIG. 6B, the inset channel 96 (between the first and second shoulder members 92, 94) is seated within the receiving slot 44, and the ramp portion 64 of spring member 60 is in the locked position L2. The locked position L2 may be the same or similar to the at-rest position shown in FIG. 3. Again, the lower surface 70 of the ramp portion 64 abuts and contacts the upper surface 97 of second shoulder member 94 to retain the same therein. The curvature of the lower surface 70 of the ramp portion 64 and the curvature of the upper surface 97 of the second shoulder member 94 complement one another to provide a more robust retaining configuration. As noted above, the ramp portion 64 is configured to deflect as the pivot bushing 86 is inserted into the receiving slot 44. Once the pivot bushing 86 clears the lower edge 70 of the ramp portion 64, the ramp portion 64 will spring back towards the at-rest or locked position L2 as biased thereto. It is contemplated that when the upper surface 97 of the second shoulder member 94 clears the lower edge 70 of the ramp portion 64 of the spring member 60, the bumper 52 is compressed by the engagement of the upper contact surface 54 of the bumper 52 abutting the lower surface 95 of the second shoulder member 94. This configuration is shown in FIG. 6A. Again, the bumper 52 provides a noise dampening feature for the locking mechanism described above. In this way, the locking mechanism provides a set-in engagement for easily coupling a seatback member to a vehicle in an efficient yet robust manner. As noted above, the efficient coupling of the present locking mechanism also allows for articulation of the seatback member along the path as indicated by arrow 20 shown in FIG. 1A.

Figure 7:
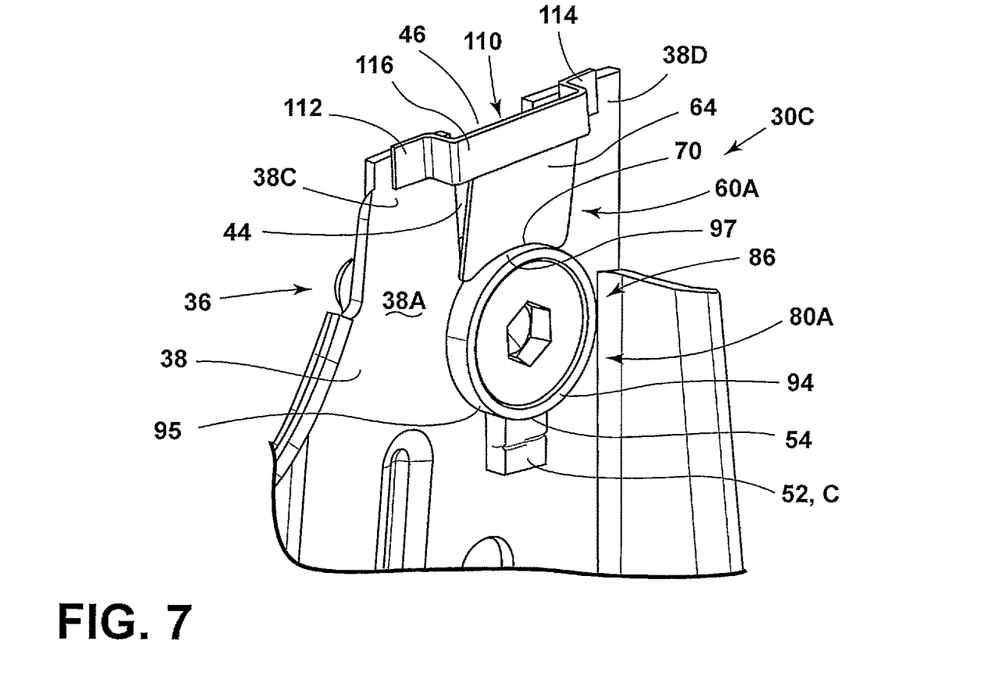
FIG. 7 is a top perspective view of a pivot member engaged in a slot of a support bracket according to another embodiment.
Figure 8:
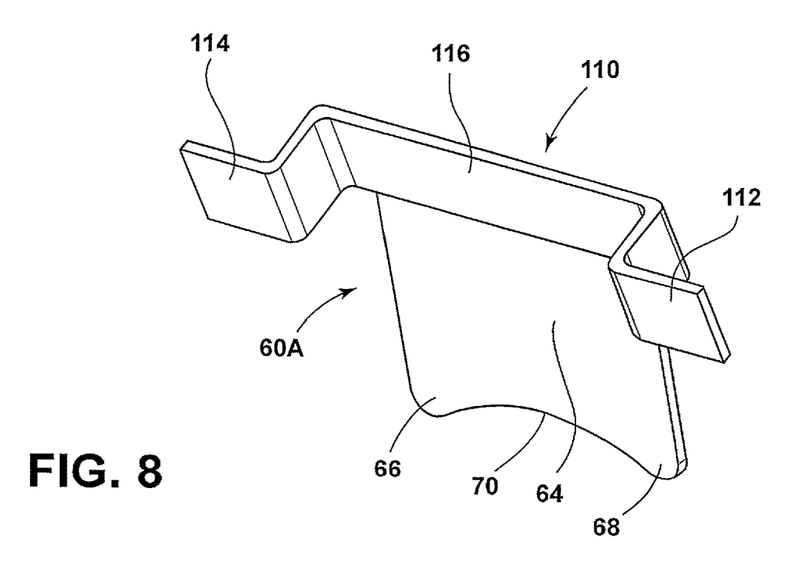
FIG. 8 is a top perspective view of a ramp locking feature of FIG. 7A.

Referring now to FIG. 7, another embodiment of a locking mechanism is shown, wherein a support bracket 30C includes a riser 36 having a body portion 38 and a receiving slot 44 having an open top portion 46. The receiving slot 44 of support bracket 30C is generally defined by upwardly extending flanges 38C, 38D. An attachment bracket 110 is shown having first and second anchor landings 112, 114 with an inwardly extending attachment landing 116 disposed therebetween. The inwardly extending attachment landing 116 includes a spring member 60A having a ramp portion 64 extending downwardly therefrom. The ramp portion 64 includes a lower curved edge 70 and corner portions 66, 68 disposed on opposite sides thereof. In use, the locking mechanism of the embodiment shown in FIGS. 7 and 8 operates in a similar manner to the locking mechanism described above with reference to FIGS. 1-6B. The first and second anchor landings 112, 114 of attachment bracket 110 are configured to couple to the upwardly extending flanges 38C, 38D of the support bracket 30C. The attachment landing 116 disposed between the first and second anchor landings 112, 114 spans the gap of the receiving slot 44 and allows for room of the open top 46 of the receiving slot 44. With the offset or inwardly extending configuration of attachment landing 116, the ramp portion 64 of the spring member 60A can be inwardly angled towards the outer surface 38A of the body portion 38 of the riser 36. Further, the offset configuration of the attachment landing 116 allows for the second shoulder member 94 of the pivot member 80A to clear the attachment bracket 110 and engage the ramp portion 64 for deflection of the same from an at-rest position to a loaded position. In the locked position shown in FIG. 7, the spring member 60A has the lower edge 70 of the ramp portion 64 engaged with the supper surface 97 of the second shoulder member 94 for retaining the same within the receiving slot 44. In the embodiment shown in FIG. 7, the bumper 52 is similarly placed on the outer surface 38A of body portion 38 of the riser 36 to engage the lower surface 95 of the second shoulder member 94 at upper contact surface 54 to provide a noise dampening feature for the locking mechanism of the present invention.

Figure 9A:
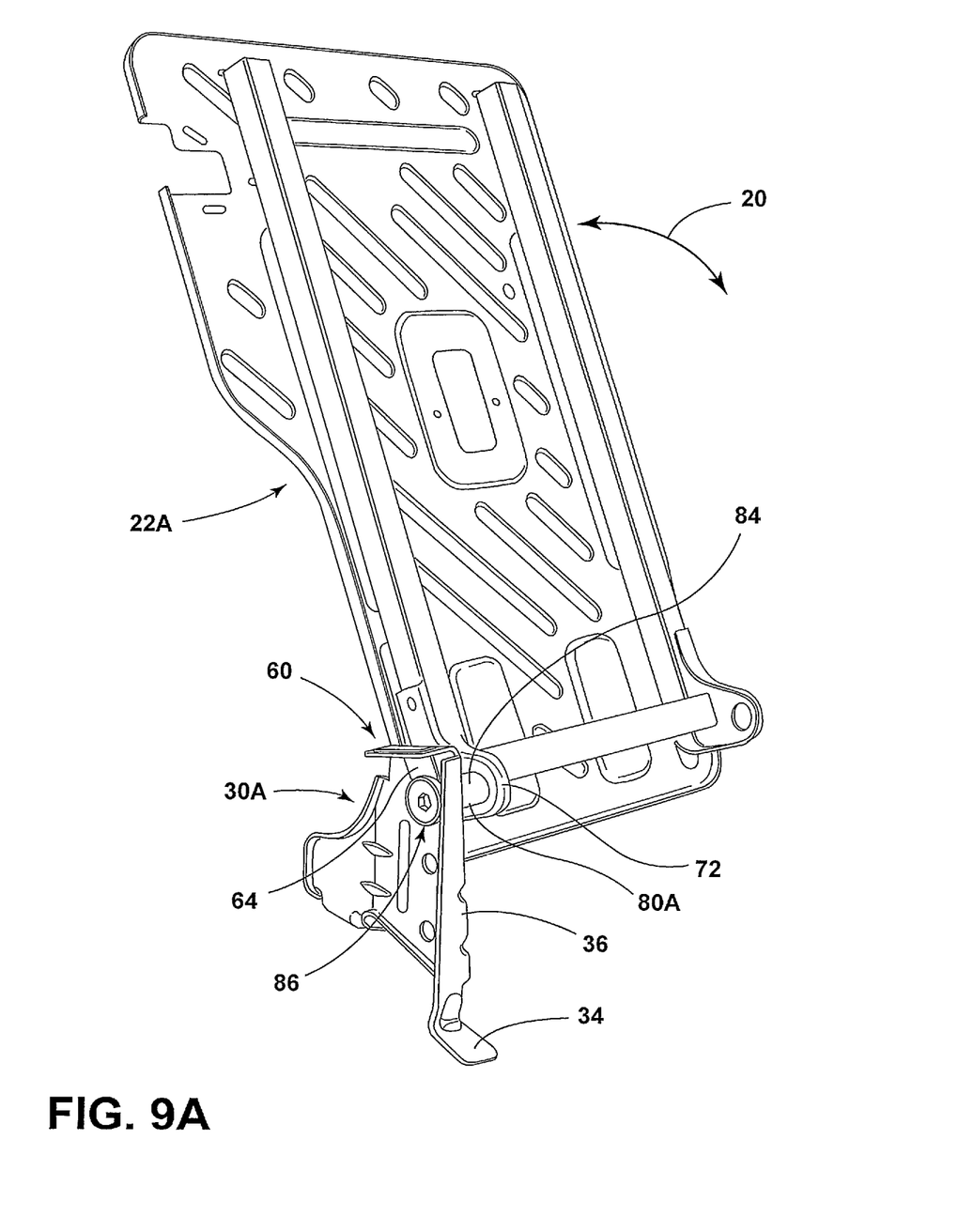
FIG. 9A is a top perspective view of a seatback frame coupled to a support bracket.
Figure 9B:
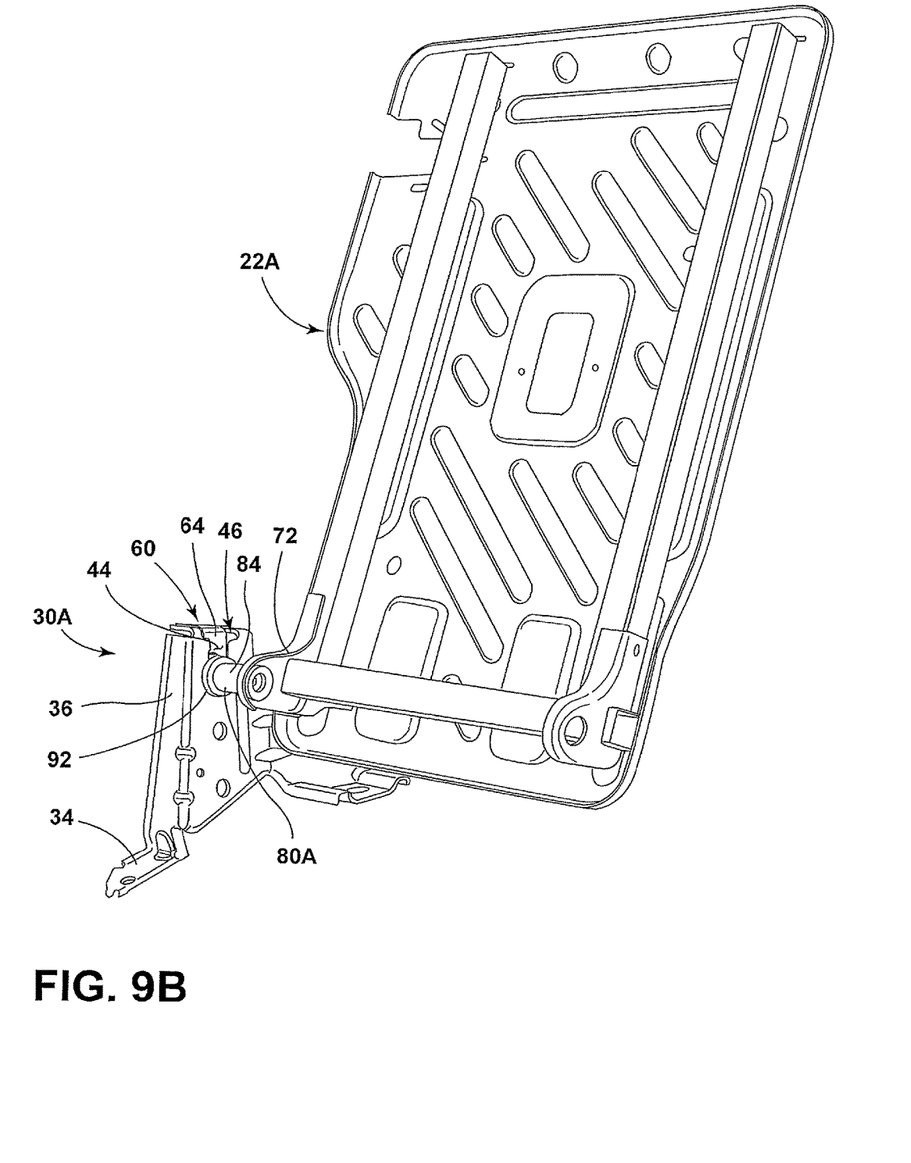
FIG. 9B is a top perspective inside view of the seatback frame and support bracket of FIG. 9A.

Referring now to FIGS. 9A and 9B, the seatback frame member 22A is shown having a pivot member 80B coupled to an attachment bracket 72 at mounting shaft 84. As noted above, the mounting shaft 84 pivots relative to pivot bushing 86 to allow the seatback frame member 22A to articulate between upright and folded down positions along the path as indicated by arrow 20. In the embodiment shown in FIG. 9A, the pivot member 80B is coupled to support bracket 30B at receiving slot 44 as shown in FIG. 9B. Thus, it is contemplated that the pivot members 80A, 80B can be fixedly coupled to the seatback frame members 22A, 22B by press-fit welding or other-like connection, such that the pivot member 80A is a fixed part of the seatback frame member 22A. In this way, a finished seatback portion, such as seatback portion 18A shown in FIG. 1A can be installed on a vehicle at support bracket 30A as a finish member upon installation. The ease of the set-in or drop-in place locking mechanism provides for quick securing of a seatback to a vehicle in a robust manner that still provides for articulation of the seatback between upright and folded down positions.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An articulating locking mechanism, comprising:
   a support bracket having an upwardly opening receiving slot with an open top portion and closed bottom portion;
   a spring member having a mounting portion and a ramp portion extending downwardly from the mounting portion, wherein the mounting portion of the spring member is fixedly coupled to the support bracket, and further wherein the ramp portion of the spring member is disposed adjacent to the receiving slot; and
   a pivot member having a pivot bushing and a rotating mounting shaft extending outwardly from the pivot bushing, wherein the pivot bushing is received in the receiving slot of the support bracket, and further wherein an outermost portion of the pivot member is configured to engage and deflect the ramp portion of the spring member from an at-rest position to a loaded position as the pivot member is received in the receiving slot, wherein the pivot bushing is retained in the receiving slot by a lower edge of the ramp portion of the spring member when the pivot bushing is fully seated in the receiving slot.

2. The articulating locking mechanism of claim 1, wherein the pivot bushing includes an outer sleeve having first and second shoulder members spaced-apart from one another to define an inset channel therebetween.

3. The articulating locking mechanism of claim 2, wherein the upwardly opening receiving slot includes a rim portion that is received in the inset channel when the pivot member is fully seated in the receiving slot.

4. The articulating locking mechanism of claim 3, wherein the first shoulder member is disposed on an inner surface of the support bracket when the pivot member is fully seated in the receiving slot, and further wherein the second shoulder member is disposed on an outer surface of the support bracket when the pivot member is fully seated in the receiving slot.

5. The articulating locking mechanism of claim 4, wherein the second shoulder member includes an upper surface and a lower surface, wherein the upper surface is engaged by a lower edge of the ramp portion of the spring member when the pivot member is fully seated in the receiving slot to positively retain the pivot member in the receiving slot.

6. The articulating locking mechanism of claim 5, including:
   a bumper disposed on the support bracket below the closed bottom portion of the upwardly opening receiving slot, wherein the bumper is a flexibly resilient member.

7. The articulating locking mechanism of claim 6, wherein the lower surface of the second shoulder member engages an upper contact surface of the bumper when the pivot member is fully seated in the receiving slot.

8. The articulating locking mechanism of claim 7, wherein the bumper imparts an upward force on the pivot bushing when the pivot member is fully seated in the receiving slot.

9. An articulating locking mechanism, comprising:
   a support bracket including an anchor portion configured to couple to a vehicle frame and a riser portion extending upwardly from the anchor portion and having a body portion with inner and outer surfaces, a mounting tab, and a receiving slot, wherein the mounting tab extends outwardly from the body portion;
   a spring member having a mounting portion coupled to the mounting tab of the support bracket, wherein the spring member includes a deflectable ramp portion disposed adjacent to the receiving slot, and further wherein the deflectable ramp portion extends inwardly at an angle from the mounting portion towards the receiving slot in an at-rest position; and
   a pivot member having a pivot bushing received in the receiving slot of the support bracket, wherein the pivot bushing is retained by the ramp portion of the spring member as received in the receiving slot, wherein the pivot member is configured to be vertically received in the receiving slot, and further wherein an outermost portion of the pivot member is configured to engage and deflect the deflectable ramp portion from the at-rest position to a loaded position as the pivot member is received in the receiving slot.

10. The articulating locking mechanism of claim 9, wherein the deflectable ramp portion of the spring member is biased to move from the loaded position to the at-rest position when the outermost portion of the pivot member clears a lower edge of the spring member.

11. The articulating locking mechanism of claim 10, wherein the outermost portion of the pivot member is engaged by the lower edge of the deflectable ramp portion of the spring member when the pivot member is fully seated in the receiving slot to positively retain the pivot member in the receiving slot.

12. The articulating locking mechanism of claim 11, including:
   a bumper disposed on the support bracket, wherein the bumper is a flexibly resilient member configured to impart an outward force on the pivot bushing when the pivot member is fully seated in the receiving slot.

13. An articulating locking mechanism, comprising:
   a support bracket having an outwardly opening receiving slot with an open top portion and closed bottom portion;
   a spring member having a mounting portion and a ramp portion extending downwardly from the mounting portion, wherein the mounting portion of the spring member is fixedly coupled to the support bracket, and further wherein ramp portion of the spring member is operable between at-rest and loaded positions adjacent to the receiving slot; and
   a pivot member having a pivot bushing and a rotating mounting shaft extending outwardly from the pivot bushing, wherein the pivot bushing is received in the receiving slot of the support bracket, and further wherein the pivot bushing is retained by the ramp portion of the spring member when fully seated in the receiving slot.

14. The articulating locking mechanism of claim 13, wherein an outermost portion of the pivot member is configured to engage and deflect the ramp portion of the spring member from the at-rest position to the loaded position as the pivot member is received in the receiving slot.

15. The articulating locking mechanism of claim 1, including:
   a bumper disposed on the support bracket, wherein the bumper is a flexibly resilient member configured to impart an outward force on the pivot bushing when the pivot member is received in the receiving slot.

16. The articulating locking mechanism of claim 13, wherein the ramp portion of the spring member is disposed at an angle directed towards the receiving slot in the at-rest position.

\* \* \* \* \*